No. 607,513. Patented July 19, 1898.
E. M. KNIGHT.
COMBINED FILTER AND COOLER.
(Application filed May 3, 1897.)

(No Model.) 2 Sheets—Sheet I.

WITNESSES
Chapman W. Fowler.
L. B. Muzzy.

INVENTOR
Edward M. Knight
by T. Walter Fowler
his Attorney

No. 607,513. Patented July 19, 1898.
E. M. KNIGHT.
COMBINED FILTER AND COOLER.
(Application filed May 3, 1897.)
(No Model.) 2 Sheets—Sheet 2.
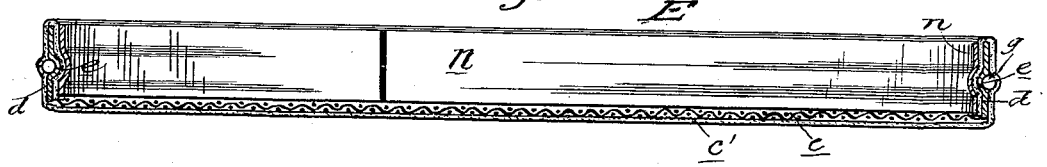
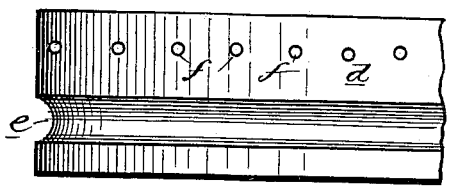
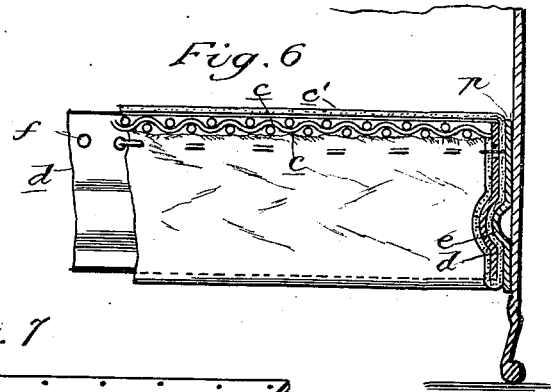
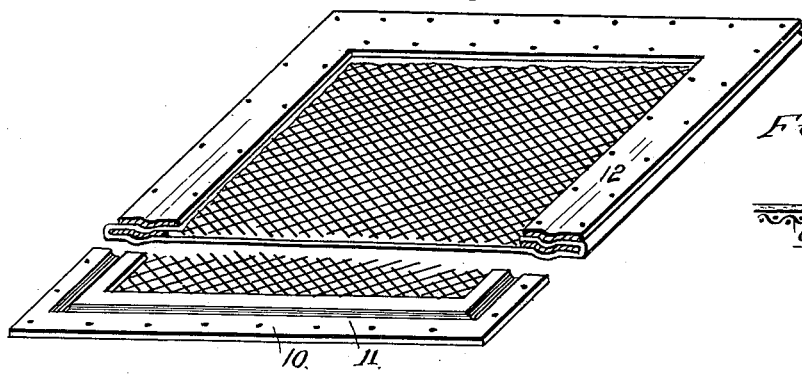
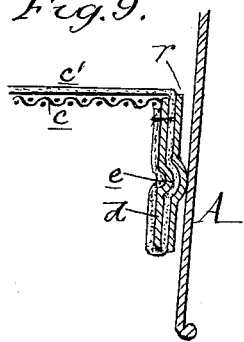
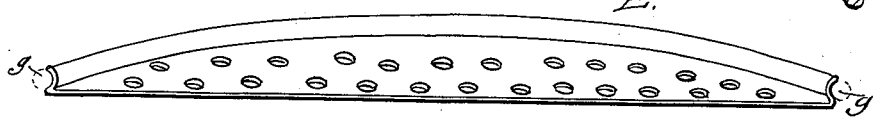
WITNESSES
Chapman N. Fowler
L. B. Muzzy.
INVENTOR
Edward M. Knight
by T. Walter Fowler
his Attorney
THE NORRIS PETERS CO., PHOTO-LITHO., WASHINGTON, D. C.

UNITED STATES PATENT OFFICE.

EDWARD M. KNIGHT, OF NEW YORK, N. Y.

COMBINED FILTER AND COOLER.

SPECIFICATION forming part of Letters Patent No. 607,513, dated July 19, 1898.

Application filed May 3, 1897. Serial No. 634,903. (No model.)

*To all whom it may concern:*

Be it known that I, EDWARD M. KNIGHT, a citizen of the United States, residing at New York, (Brooklyn,) in the county of Kings and State of New York, have invented certain new and useful Improvements in a Combined Filter and Cooler, of which the following is a specification, reference being had therein to the accompanying drawings.

My invention relates to what might be termed a "combined filter and cooler for filtered water," the object of the invention being to filter and to cool the water after it has been filtered and also to filter the ice which is used in the operation.

My invention consists of the parts and the constructions and combinations of parts hereinafter described and claimed.

Figure 1:
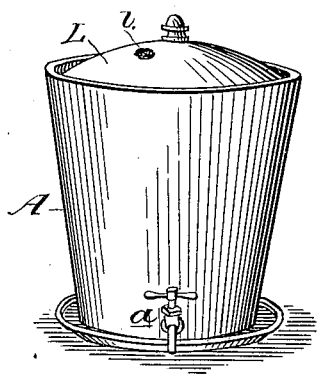
Figure 2:
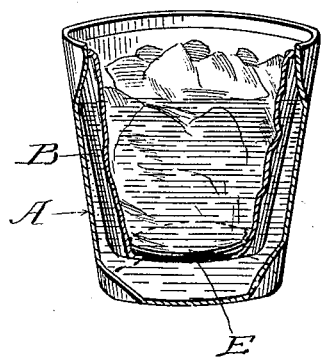
Figure 3:
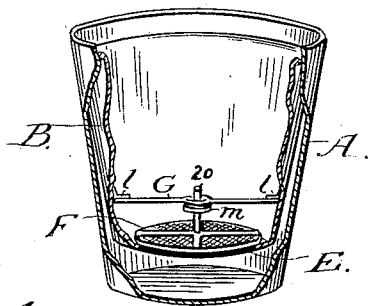
Figure 4:
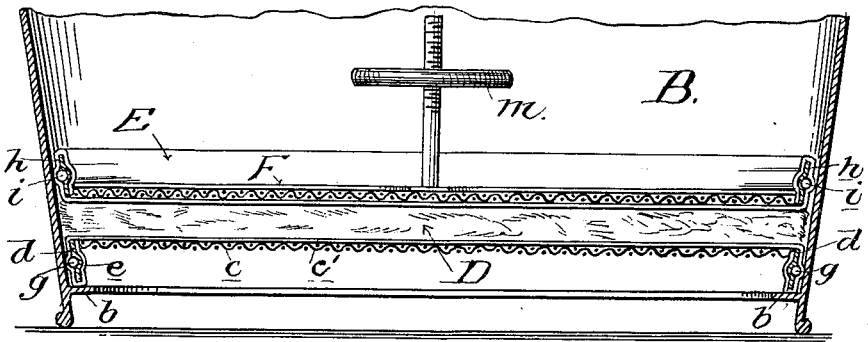

In the accompanying drawings, forming part of this invention and in which similar letters of reference indicate corresponding parts, Figure 1 represents a perspective view of my improved filter and cooler. Figs. 2 and 3 are similar views with a portion of the inner and outer vessels broken away to expose the filter-disks or medium. Fig. 4 is an enlarged sectional view of the filter-disks and a portion of the inner vessel. Figs. 5 and 5$^a$ are enlarged sectional views of one of said disks. Figs. 6, 7, 8, and 9 are modifications to be referred to.

In carrying out my invention I use by preference two vessels of substantially the same shape, but of different size, whereby one may be contained within the other and supported therein to provide a space which surrounds the bottom and sides of the innermost vessel. The outer vessel A, I construct of some material that is a good non-conductor of heat and cold, a very cheap, light, and desirable material for the purpose being wood fiber or paper-pulp; but I do not wish to limit myself to these or any other specific material. This exterior vessel is the one which is to contain the filtered water, and it has any well-known or desired form of draw-off or cock $a$, through which the filtered water may be drawn for drinking or domestic purposes. The inner vessel B, I construct of some material that will prove a good conductor of heat and cold, such as metal, said inner vessel having a flange or bead around its top adapted to engage the top edge or inner walls of the outer vessel, whereby one vessel is supported by and within the other.

The bottom of the inner vessel is open and has an inwardly-projecting flange $b$, upon which the filtering disks or medium is supported; but, if desired, the bottom of said inner vessel may consist of a foraminous plate or disk of woven wire or other reticulated material adapted to form a firm bed or support for the filtering disks or medium and the superposed column of water or body of ice.

In the drawings, Figs. 3 and 4 illustrate the bottom as formed by the lower disk supported upon the said flange $b$ and readily removable for renewing and cleansing of itself and the vessel which contains it. This disk, which may be of circular, square, or other shape, depending on the shape of the vessel, consists of the woven-wire or foraminous disk or portion $c$ and the encircling downwardly-extending peripheral band or strip $d$, the outer edges of the woven-wire or foraminous disk being united by soldering or otherwise to the inner wall of the band or strip. In making the band or strip $d$ I roll or otherwise form its outer wall with a circumferential groove or depression $e$, Fig. 5$^a$, and in the portion of the band above this groove I form a series of holes $f$. Within the groove or depression I place a cord or rope $g$, which is preferably composed of asbestos, the relative depth of the groove and size of the cord or rope being such that the latter will project somewhat beyond the plane of the outer circumference of the band or strip. When the parts are thus made and assembled, I cover the upper face of the woven-wire or foraminous disk or portion $c$ with a sheet of woven asbestos $c'$ of a character well known in this art, and I bring the outer edge of this sheet over the outside of the band or strip $d$ and its cord or rope $g$ and turn it inward over the opposite edge of the band or strip and secure it by stitching through it and the series of holes $f$ before alluded to. The disk is now ready to be placed in the filter, and it is seated upon the flange $b$ of the inner vessel, as before mentioned. On the top of this disk I place one or more of my improved filtering-disks, felts, or diaphragms D, composed of comminuted asbestos and an organic fibrous substance—as cotton fiber, for instance—which said disks or felts are described more at length and form the subject-matter of the claims of another application filed by me of even date herewith, Serial No. 634,902, and upon said disk or diaphragm D, I place a disk E, composed of woven wire or foraminous material and a surrounding band or strip of the character described for the lower disk C, said disk E having a sheet or piece of woven asbestos over its under face and having its edge brought up over the exterior of its band or strip $h$ and the cord or rope $i$ in the groove thereof and stitched through the series of holes $f$, the same as before described. This upper disk is formed with a spider F, from the center of which rises a threaded stem or rod 20, over which is intended to be passed a cross-bar G, whose ends are adapted to pass under lugs $l$, projecting from the inside of the inner vessel, said cross-bar being raised into close contact with the lugs by means of the hand-wheel $m$ or equivalent device threaded on the stem or rod, as and for the purpose described in my former patent, No. 557,399, dated March 31, 1896.

Inside of the bands or strips $d$ and $h$ may be placed a split or other ring or flange $n$, (see Fig. 5,) having a groove which matches with the convex rear walls of the grooves in said bands or strips, said inside ring adapted to be pressed against the turned-over edges of the woven-asbestos sheets and to fit the convex portion of the groove of the outer band or strip to make a neat finish and a joint so close that the particles of asbestos which are liable to be washed off by the action of the water will not find their way into the filtered water. The raw edges of the cloth are also shielded and protected against disintegration, so as to break away from the stitching-holes by thus closely confining them.

When I desire to construct a filter in which it is preferred to solder the disk rigidly in place within the vessel, I alter the construction somewhat, as the presence of the asbestos cloth about the circumference of the disk will prevent successful soldering, owing to the absence of a metal surface. In such cases I omit the cord or rope from the groove in the band or strip, but turn the edge of the woven asbestos inward and secure it by stitching, as previously specified. I then take a grooved ring or band $p$, corresponding in form to the band or strip of the disk, and I press it upon the latter band, so that the convex portion of its groove will fit into the concaved portion of the other band, and thus firmly and securely clamp the downwardly-turned edge of the woven asbestos between them to make a tight joint. This also leaves the outer band or ring exposed, so that it may be soldered in place, as shown in Fig. 6. In using this feature of securing the woven asbestos between two matching grooved surfaces for square or rectangular filter-frames of the type shown in Fig. 7 I simply construct the frame 10 with a groove 11, and I take another piece 12 with an open center and I form a groove in it and then lay the two pieces one on the other, so that the convex portion of the groove of one piece will enter the concave portion of the groove of the other piece. The asbestos cloth having been secured to the frame 10 and its edges turned over the same and over the groove thereof, as before described, and the frame 12 having been placed in position, I press the parts together to clamp the turned-over portion of the fabric between the two grooved frames to make a tight joint, after which the frames are riveted, bolted, or otherwise secured. I thus obtain a water-tight joint for the turned-over portions of the cloth by means of concavo-convex surfaces, between which said portions of the cloth are clamped, and a substantially smooth and continuous surface is presented on the face of the disk, so that the filtering medium shall have a smooth bed to rest upon.

In all cases where the cord or rope is used in the grooved portions of the bands or strips the said cord or rope will project slightly, so that when the disk or frame is pressed into place the cord or rope will respond to any irregularities in the inner wall of the containing vessel and will make an absolutely tight joint, this being so whether the turned-over edge of the cloth is exterior or interior to the cord or whether the cloth is entirely omitted, as shown in Fig. 8, which latter form of disk may be found useful for certain purposes.

In using my combined filter and cooler I fill the inside vessel with ice, or at least I place enough ice therein for my purpose. Then I pour in the water, which filters rapidly and completely through the disks and diaphragms, leaving the ice in said inner vessel. The filtered water will rise in the outer vessel and is always in contact with the cold sides of the inner vessel, which, being of conducting material, will have approximately the same temperature as that of the ice, will reduce the temperature of the filtered water, and maintain it cool and palatable. The exterior vessel being of non-conducting material prevents the escape of cold and the admission of warm air from the outside. These results are aided by the vessels having a substantially tight cover L, and the necessary air to prevent the formation of a vacuum is admitted through an aperture $l$, plugged with cotton wool or other fibrous material which filters the air slowly in and prevents a large body of warm air entering the ice-chamber.

A filter of the character described has been practically tested and is found very efficient and rapid and specially adapted for household purposes.

In Fig. 9 is illustrated a modification of Fig. 6 and in which the convex side of the groove-band $r$ is turned outwardly to facilitate the soldering of the disk in the plates. This may be done without departing from the spirit of my invention.

Having thus described my invention, what I claim as new, and desire to secure by Letters Patent, is—

1. A combined filter and cooler consisting of an exterior vessel of non-conducting material and an inner vessel of conducting material separated therefrom to form an intervening filtered-water space, in combination with a filtering-diaphragm comprising a foraminous disk having a covering of fibrous material and a peripheral band or flange set on edge and provided with a groove and annular series of perforations, and a cord or rope in said groove, said fibrous covering having its edge carried over the exterior of the band or flange and cord or rope and returned upon the interior thereof, and secured by stitching through said perforations.

2. A combined filter and cooler consisting of an inner and an outer vessel separated from each other to provide an intervening filtered-water space, a plurality of filtering-diaphragms in the inner vessel and each consisting of a foraminous, fibrous-covered disk having a peripheral band or flange set on edge and provided with a groove, a cord or rope in said groove and a mass of filtering material between the diaphragms and consisting of the fibers of an inorganic and an organic substance intimately mingled and compacted, said covering of the diaphragms having its edge carried over the exterior of the band or flange and the cord or rope and returned upon the interior of the band and secured.

3. In a filter, a foraminous filter disk or plate having a surrounding flange or band, said flange or band extending vertically above the disk or plate and having a circumferential groove, a sheet of filtering material over said disk and having its free edge turned up over said band or flange and secured, and a rope or cord within the groove of the flange or band and between the groove and the inner side of the sheet, adapted to maintain a tight joint with the walls of the vessel.

4. In a filter, a foraminous filter disk or plate having a surrounding flange or band provided with a groove and a series of holes, a sheet of filtering material passed over the disk or plate and flange or band, and having its free edges turned inward and secured to said holes, and a cord or rope within the groove of the band or flange interior of the filtering material and adapted to maintain a tight joint with the walls of the vessel.

In testimony whereof I affix my signature in presence of two witnesses.

EDWARD M. KNIGHT.

Witnesses:
CHAS. W. LINK,
JOS. SIMPSON.